US008182007B2

(12) United States Patent
Fisher

(10) Patent No.: US 8,182,007 B2
(45) Date of Patent: May 22, 2012

(54) SHOVEL ATTACHMENT

(76) Inventor: Robert Fisher, Babylon, NY (US)

( * ) Notice: Subject to any disclaimer, the term of this patent is extended or adjusted under 35 U.S.C. 154(b) by 0 days.

(21) Appl. No.: 12/930,551

(22) Filed: Jan. 10, 2011

(65) Prior Publication Data

US 2011/0175382 A1 Jul. 21, 2011

Related U.S. Application Data

(60) Provisional application No. 61/335,543, filed on Jan. 8, 2010.

(51) Int. Cl.
*A01B 1/22* (2006.01)
*B25G 3/00* (2006.01)

(52) U.S. Cl. ........................................ 294/58; 294/54.5

(58) Field of Classification Search .................... 294/58, 294/178, 54.5, 57; 16/426, 429
See application file for complete search history.

(56) References Cited

U.S. PATENT DOCUMENTS 2,521,441 A * 9/1950 Bickley .......................... 294/58
4,129,327 A * 12/1978 Moore, Jr. ....................... 294/58
4,200,324 A * 4/1980 Helton ............................ 294/58
5,411,305 A * 5/1995 Revoldt ........................... 294/58
5,472,252 A * 12/1995 Barone ........................... 294/58
5,704,672 A * 1/1998 Sims ............................... 294/58
7,077,444 B2 * 7/2006 Kaufman et al. ............... 294/58
2004/0232715 A1 * 11/2004 Stuart ............................ 294/58
2008/0042458 A1 * 2/2008 Ricket ............................ 294/58

* cited by examiner

*Primary Examiner* — Dean Kramer

(74) *Attorney, Agent, or Firm* — Thomas A. O'Rourke; Bodner & O'Rourke, LLP

(57) ABSTRACT

The present invention is directed to a shovel attachment that is designed to reduce the stress incurred on an operator's muscles, back, joints, spine, and heart during shoveling. The shovel attachment is designed to attach a second handle to a shovel so that an operator may distribute the weight of a shoveled load between both handles and therefore reduce the stress incurred while shoveling. The attachment includes an auxiliary handle having two ends, a first flexible member wherein a portion of the first flexible member extends from both ends of the auxiliary handle, a length adjuster that is attached to the free ends of the first flexible members, and a second flexible member that is attached to each length adjuster and where each end extends to a different coupling member for coupling each end of the second flexible members to either end of the leading edge of a shovel blade.

16 Claims, 8 Drawing Sheets

Figure 9
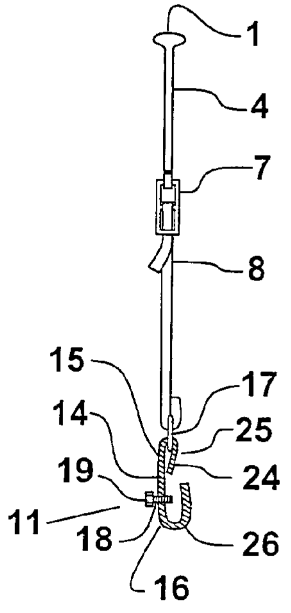
Figure 10
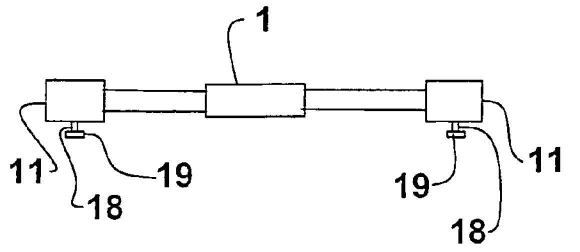
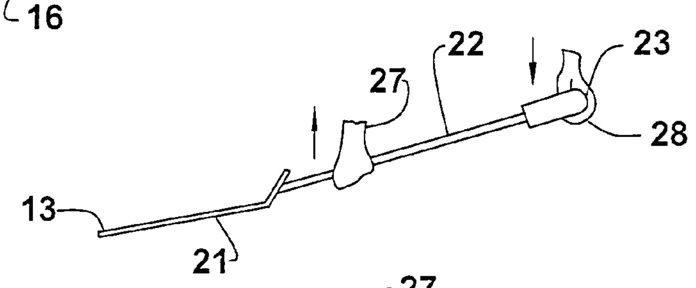
Figure 11
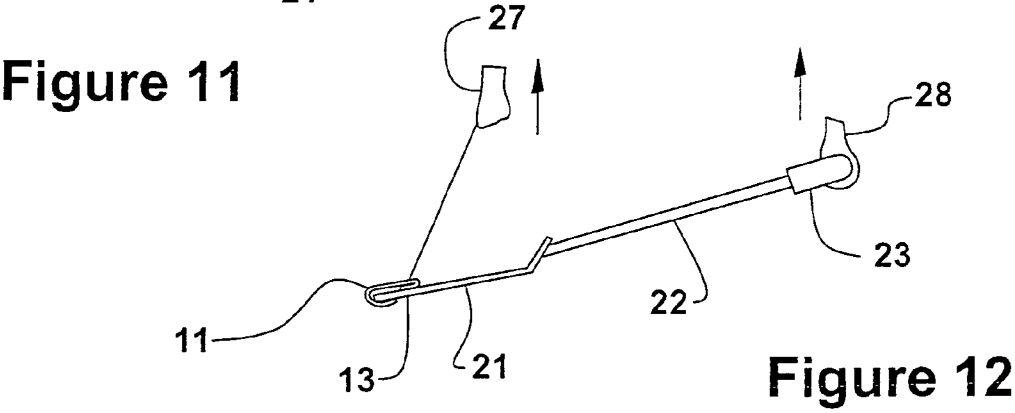
Figure 12

SHOVEL ATTACHMENT

This application claims priority on U.S. Provisional Application Ser. No. 61/335,543 filed on Jan. 8, 2010, the disclosures of which are incorporated herein by reference.

FIELD OF THE INVENTION

The present invention is directed to an attachment for a shovel, spade or other similar lifting implement. The invention provides a shovel with a second auxiliary handle to reduce the force required to be applied and the weight required to lift while displacing the shoveled load.

BACKGROUND OF THE INVENTION

Many different designs for shovels have been developed over the years. Most existing shovels are comprised of a blade or scoop, either straight or curved, with an edge on the bottom of the blade to help load the material onto the shovel blade. A shaft is connected to the top of shovel blade and may also be connected to a handle at its free end. A shovel is designed to move various volumes and weights of materials, such as dirt, gravel, snow, slush, or other debris. However, the amount of material that a shovel may displace is limited by the surface area of the blade or scoop and height of the load on the blade.

A shovel is generally used by applying a moving force to the handle of the shovel which is connected to a shaft that extends at an angle of approximately 30 to 45 degrees from the surface to be shoveled. The shovel is then moved underneath the material to hold a desired load and then the load is displaced by the user. On shovels of the general design described herein, the upward lifting force by a user—usually with one hand placed on the shaft usually midway between the shovel blade and handle—must be greater than the weight of the load and the weight of the shovel due to the effect of the dual cantilever beam from the load to the pivot of the hand lifting upward. This upward force causes a counter-clockwise rotation that is counteracted by a downward force using the free hand by the user on the handle to minimize or stop the rotation of the shovel or else the shovel blade will drop and the load will slide off onto the ground. The downward force is necessary to counteract the torque that is due to the distance of the load times the force necessary pushing downward by the free hand of the shovel's operator.

New designs for shovels have been developed that employ two handles—a primary handle that extends from the primary shaft where the primary shaft extends from the top of the shovel blade and a secondary handle that extends from a shaft that is connected to the shovel blade at a different location than the primary shaft or that is connected towards the primary shaft's blade end.

Ricket, U.S. Patent Application Publication No. 2008/0042458 relates to a two-handed shovel that has a first handle that connects to the shovel blade and a second handle that attaches to the blade at a permanent connection point in front of a load. Ricket specifies that the connection point can be attached by a pin, ball joint, U joint (or other mechanical fasteners).

Helton, U.S. Pat. No. 4,200,324, is directed towards a shovel with improved lifting means that includes a shovel blade having a material transporting surface and an opposite side rear surface wherein one end of a handle is attached. A second handle, i.e., a lifting bar, is attached to the material transporting surface by a ball and socket connection.

Sims, U.S. Pat. No. 5,704,672, relates to a snow shovel having a conventional blade and handle that includes an auxiliary handle attached to the shovel by means of a resilient and/or flexible cord. The ends of the auxiliary cord may be secured to holes in the shovel blade by means of hooks on the end of the cord.

U.S. Pat. No. 7,077,444 to Kaufman teaches a two handed shovel for clearing a surface, wherein the shovel comprises a blade having a leading edge which contacts the surface, a main handle attached to the blade, and an auxiliary handle pivotally attached to the blade near the leading edge. Kaufman further specifies that the auxiliary handle is attached to side lugs that are located near either end of the blade's leading edge.

U.S. Pat. No. 5,411,305 to Revoldt discloses a snow shovel that has a long handle with a shovel blade at the lower end of the long handle. A shorter handle is pivotally mounted at the long handle's lower end by a clamp that has a pair of pivot elements for engaging the lower end of the short handle.

The present invention is related to an improved, more convenient shovel attachment that will reduce the stress placed on a person's muscles, joints, back, spine, and heart while shoveling. In addition the attachment will reduce the amount of force required to lift and displace the load.

OBJECTS OF THE INVENTION

It is an object of the present invention to provide a shovel attachment that provides a second handle that allows an operator to simultaneously lift both shovel handles.

It is another object of the invention to provide a shovel attachment that reduces the stress that is placed on a person's body while using a shovel.

It is still another object of the invention to provide a shovel attachment that is easily attached to and removed from a shovel's blade.

It is a further object of the present invention to provide a shovel attachment that is easily adjusted to an operator's height.

It is an even further object of the present invention to provide a shovel attachment that provides an ergonomic advantage to an operator so that an operator may stand in an upright or bent position as desired.

SUMMARY OF THE INVENTION

The present invention is directed to a shovel attachment that is designed to reduce the stress incurred on an operator's muscles, back, joints, spine, and heart during shoveling. The shovel attachment is designed to attach a second handle to a shovel and includes an auxiliary handle having two ends, a first flexible member wherein a portion of the first flexible member extends from both ends of the auxiliary handle, a length adjusting means attached to the free ends of the first flexible members, and a second flexible member that is attached to each length adjusting means and where each end extends to a different coupling member for coupling each end of the second flexible members to either end of the leading edge of a shovel blade.

The coupling member includes a body portion, a first end, and a second end, and, preferably, a ring or other securing means attached to the first end. The first end may contain a hook like curled region for retaining the ring wherein the ring is used to connect to the end of each flexible member to secure the flexible member to the coupling member. The second end has a hook-like curled region that is designed to retain the leading edge of a shovel blade. The body portion may have a hole therein for receiving a threaded screw that is used to secure the coupling member to the shovel blade. The threaded screw may be provided with a knob on its top to provide an aid for gripping and twisting the screw.

The coupling members are attached to the ends of the leading edge of a shovel blade by hooking the coupling members' second end onto the blade's leading edge and then twisting a securing means such as a screw through the body portions' hole until the screw is in a desired contact tension with the top surface of the blade's leading edge.

It will be appreciated by those of ordinary skill in the art that the first and second end of the coupling member may be a variety of other embodiments instead of a curled hook-like region. The other embodiments may include clips, snap clips, springs, or other mechanical attachment devices that are commonly used in the art.

BRIEF DESCRIPTION OF THE DRAWINGS

FIG. 9 shows a side view of the shovel attachment that is positioned vertically.

FIG. 10 shows a side view of the shovel attachment that is positioned horizontally.

FIG. 11 shows a side view of a shovel without the shovel attachment.

FIG. 12 shows a side view of the shovel attachment that is attached to a shovel.

DETAILED DESCRIPTION OF THE INVENTION

Figure 1:
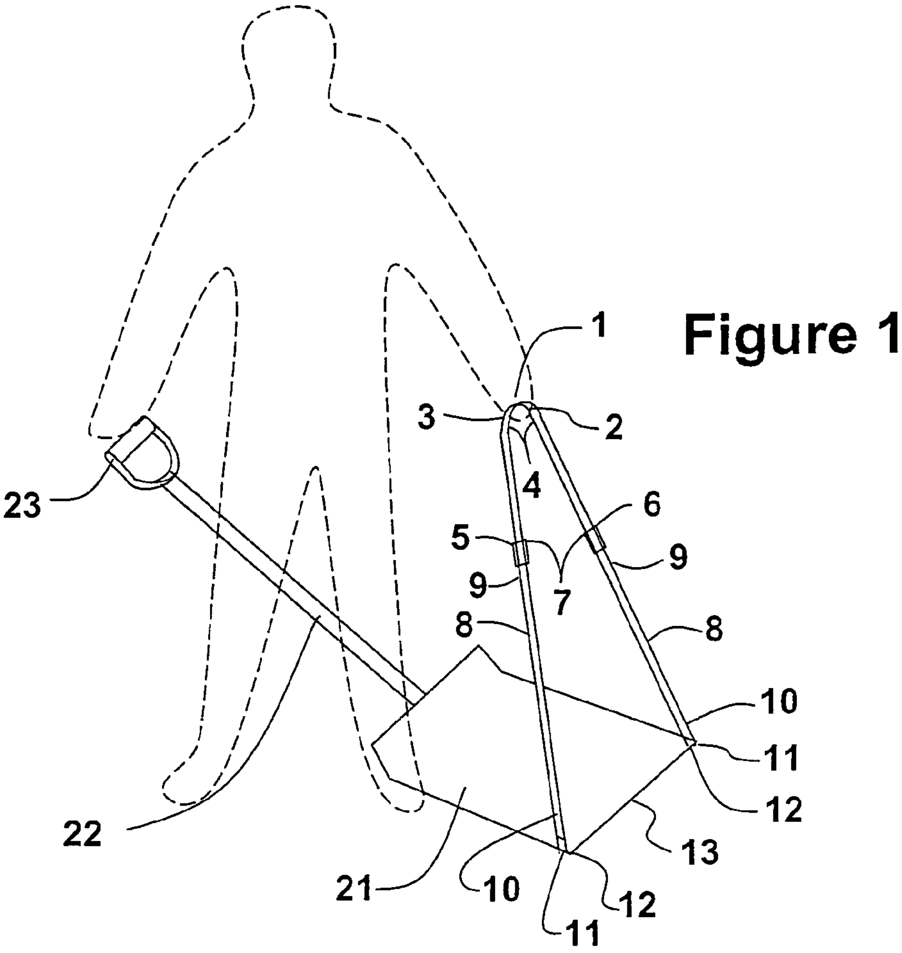
FIG. 1 shows a front view of the shovel attachment of the present invention that is attached to a shovel.

As required, detailed embodiments of the present invention are disclosed herein; however, it is to be understood that the disclosed embodiments are merely exemplary of the invention, which may be embodied in various forms. Therefore, the specific structural and functional details disclosed herein are not to be interpreted as limiting but merely as a basis for the claims and as representative basis for teaching one skilled in the art to variously employ the present invention in virtually any appropriately detailed structure.

The present invention is directed to an improved and convenient attachment for a shovel that provides a user with a second shoveling handle to assist the user in clearing snow, dirt, gravel, or other debris from a driveway, walkway, or other surface. The attachment is designed to reduce the stress on a user's joints, muscles, heart, spine and back while shoveling. The attachment is also easily and conveniently attachable to the leading edge of any type of shovel blade and includes an auxiliary handle with one or more attachment points, a first flexible member wherein a portion of the first flexible member extends from the attachment point or points of the auxiliary handle, a length adjusting means attached to the free ends of the first flexible members, and a second flexible member that is attached to each length adjusting means and where each second flexible member end extends to a different coupling member for coupling each end of the second flexible members to either end of the leading edge of a shovel blade.

The coupling member is comprised of a body portion, a first end and a second end. The first end contains a means for receiving the flexible member and the second end contains a means for retaining a shovel blade. The body portion also has a certain width and thickness for supporting the shoveled load and is adapted to receive a means for securing the coupling member to the shovel blade.

The present invention works by attaching the two coupling members to either end of the leading edge of a shovel blade. Preferably, the coupling members are positioned as close to the side edge of the leading edge of the shovel blade as possible. However, in other embodiments, the coupling members may be placed in any desired location along the blade's leading edge or even on the side edge near the leading edge. The length of the flexible members can also be adjusted so that the auxiliary handle is at a desired length. The shovel attachment makes the use of the shovel ergonomic in that an operator can stand upright in a vertical position rather than the usual bent over position, if desired. The attachment accomplishes its benefits without forcing the twisting of an operator's spine that is usually associated with single-handle shovels. For example, in the single-handle shovels, the spine of an operator will twist as the operator lifts one of their hands (hand closest to the blade) and pushes down with their other hand that is furthest from the blade. The present invention avoids this stressful activity by allowing a person to use both hands for lifting each handle upwards.

Another advantage of the present invention is that it reduces the force needed to lift the shoveled load by distributing the force required to lift the load to both handles and by allowing both hands to apply an upward lifting force rather than opposite directional forces. As a result, the present invention also reduces the increased force that is a by-product of the cantilever effect of the pivot in single-handle shovels.

The use of a two-point attachment to the leading edge of a shovel blade, as in the present invention, reduces the rotation of the shovel that is caused by having a load that is not distributed proportionally throughout the shovel. The two-point attachment assures that the load is distributed proportionally between both attachment points and, as a result, allows a user to apply the same directional force to both handles rather than opposite directional forces which are required for single-handle shovels. In addition, the single-handle shovels require the hand closest to the blade to act as a pivot point back from the load and the hand furthest from the blade to push down on the handle. As a result, the force pushing the handle down is added to the downward force from the load so that the pivot hand is required to lift a force equal to both downward forces. The present invention distributes the load without any torque of the load and positions the operator's hands to pull in the upward direction—rather than twisting the body by one hand pulling up and the other hand pushing down—without adding the load created by the counteracting torque. Any additional downward force utilized by other designs of counterweights at the handle or bent handle design create the torque described above and add force to the lift.

One type of use for the shovel attachment, as noted previously, is with a snow shovel. Most existing snow shovels are comprised of a blade that is either straight or curved, with a leading edge on the bottom of the shovel blade to help load the material onto the blade. A shaft is used to connect the blade to the shaft and is usually positioned between the top of the blade and the handle. Currently, a shovel, such as a snow shovel, is used to move various volumes and weights of materials, such as snow and slush. The weight of the load on the scoop is limited by the surface area of the scoop or blade and the height of the load on the blade. The snow shovel is normally used by pushing the shovel forward by a handle connected to the shaft that is at a variable angle approximated to be 30 to 45 degrees to the surface to be cleared. The main pushing force is exerted by the right hand of a right-handed person. Once the shovel blade is moved under the snow or slush so that the surface of the blade holds a desired weight, the operator lifts the shovel. On existing single-handle shovels, the force on the operator's left hand to pull upward must be greater than the weight of the snow load and the weight of the shovel blade. In addition, the right hand must push down on the handle or the load end will likely drop and the load will likely slide off the blade. The present invention allows the operator to stand upright or bent over as they feel comfortable and distributes the load proportionally between the operator's hands, which allows both hands to lift instead of one hand lifting and one hand pushing and thereby reduces the force required by each hand and the stress on the body.

FIG. 1 shows a preferred embodiment of the shovel attachment of the present invention that is attached to a shovel. It shows the shovel attachment as having an auxiliary handle 1 that has two ends 2 and 3, and that has a first flexible member 4 extending from the handle's 1 ends 2 and 3. The first flexible member connects to a length adjuster 7 at each first flexible member end 5 and 6. A second flexible member 8, having a top end 9 and a lower end 10, extends from each length adjuster 7 from its top end 9 towards a shovel blade coupling member 11 at the second members' lower end 10. The coupling members may be 11 coupled to opposite ends 12 of the leading edge 13 of a shovel blade in order to connect the attachment to the blade's leading edge 13. In other embodiments, the coupling member 11 may be placed anywhere along the shovel blade's leading edge 13 as desired.

The shovel that is shown in FIG. 1 has a blade 21, a shaft portion 22 connected to the blade, and a primary handle 23 that is connected to the opposite end of the shaft.

Figure 2:
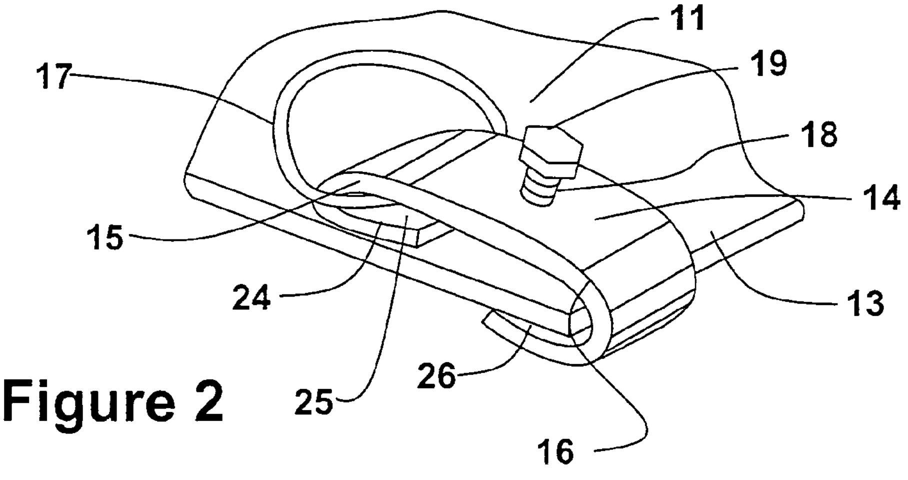
FIG. 2 shows a perspective view of the coupling member that is attached to the leading edge of a shovel blade.

FIG. 2 shows the coupling member 11 as having a body portion 14, a first end 15, and a second end 16. The body portion is connected to the flexible member at its first end 15 and retains the ends 12 of the leading edge 13 of the shovel blade at its second end 16. The first end 15 has a means for retaining the second flexible member. This means may be any suitable means that secures the flexible member to the coupling member known in the art. This means may, for example, include a hook-like curled end 24 that is curled as such to form a region 25 for receiving a ring 17 that attaches to the second flexible member. The second end 16 can have a means for retaining the leading edge of a shovel blade 13 that includes, for example, a hook-like curled end 26 that is curled to form an angle of less than about 90 degrees. Preferably, the angle is less than about 60 degrees. More preferably, the angle is less than about 45 degrees. Most preferably, the angle is from about 10 degrees to about 30 degrees.

The body portion 14 having a means for securing the coupling member to the shovel blade is also illustrated in FIG. 2. The securing means may include a threaded screw 18 that has a knob 19 attached to its top end. The screw fits into and is twisted through a correspondingly threaded hole (not shown) that may be located in the center of the surface of the body portion 14. The coupling member is secured to the shovel blade by twisting the screw 18 until the screw is in a desired contact tension with the top surface of the leading edge 13 of the shovel blade so that the coupling member is securely fitted to the blade's leading edge 13.

In one embodiment, the attachment means of the present invention secures solely to the leading edge of the blade of the snow shovel. Most shovels have a leading edge for the blade which ends in a sidewall or side edge at each side of the blade. The attachment of the present invention in one embodiment is secured to the leading edge adjacent to each sidewall or side edge of the blade. Preferably, the attachment means is secured to the leading edge of the blade at a location defined by y=(⅛)(x), where x is the length of the leading edge of the blade and y is distance from the sidewall or side edge that each coupling member is to be positioned on the leading edge. For example, a shovel blade that has a leading edge of 24 inches will have secured coupling members that are positioned 3 inches away from each sidewall or side edge.

FIG. 2 also shows the knob 19, which may be knurled or contain other, different gripping means along its side surface or other surfaces known in the art. Alternatively, a different turning aid may be used in conjunction with or rather than a knob, such as a small metal or plastic bar that runs perpendicular to the threaded screw and that helps a user gain leverage when trying to tighten the screw. Other commonly used turning and/or gripping aids may also be used. In addition, the knob or turning aid may be a larger size to make it easier for an operator to turn the knob, especially if an operator has gloves on their hands.

Figure 3:
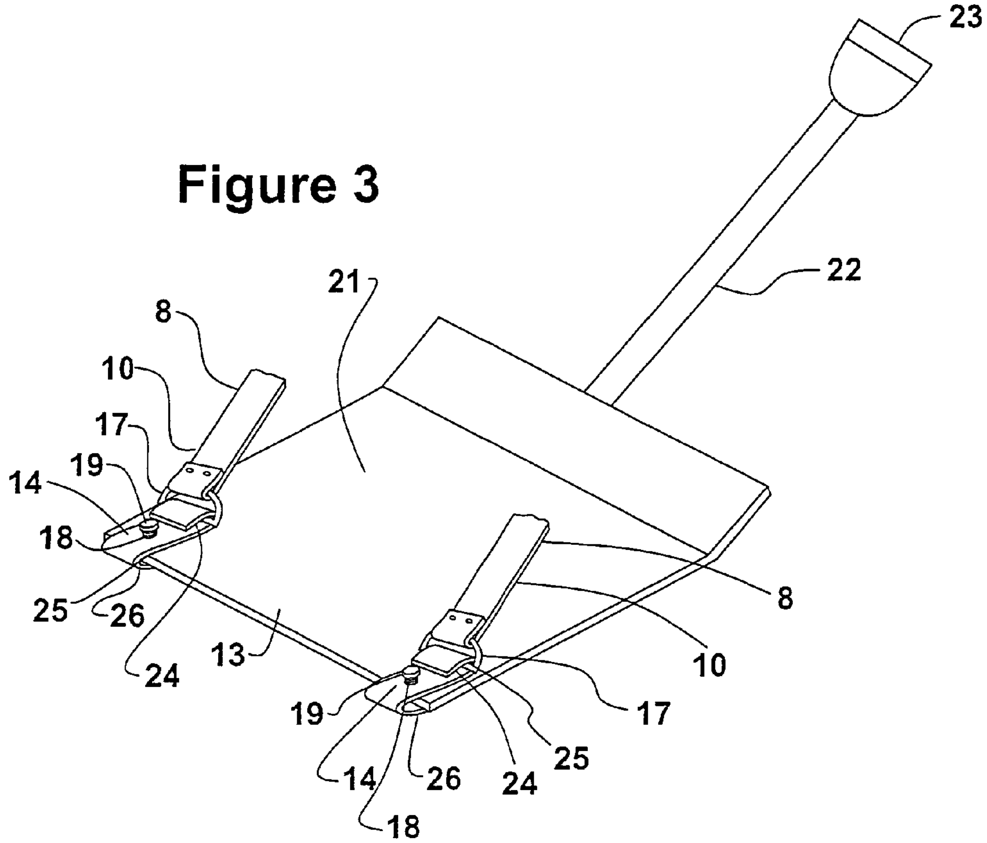
FIG. 3 shows a view of the bottom section of the shovel attachment of the present invention that is attached to a leading edge of a shovel blade.

FIG. 3 illustrates a sectional view of the shovel attachment that is attached to the leading edge of the shovel blade. It shows a shovel having a blade 21, a shaft portion 22 connected to the blade, and a primary handle 23 that is connected to the opposite end of the shaft. FIG. 3 also shows the lower ends 10 of the second flexible members 8 that are each connected to a ring 17 at their respective lower ends 10. The ring may be retained in a region 25 that is formed at a first retaining hook end 24. The body portion 14, screw 18, knob 19, and a second retaining hook end 26 that provides additional security with the leading edge 13 of the shovel blade are also shown.

Figure 4:
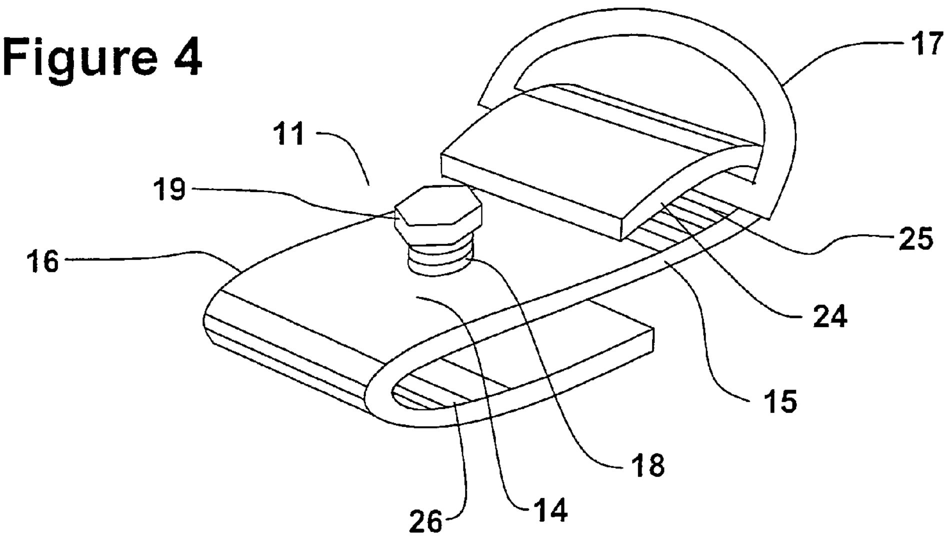
FIG. 4 shows a perspective view of the coupling member.

FIG. 4 provides a perspective view of an embodiment of the coupling member. It shows the coupling member 11 as having a body portion 14, a first end 15, and a second end 16. It also shows the first end 15 as having a retaining hook end 24 that forms a region 25 for a ring 17 to be retained. The second end 16 is also shown as having a retaining hook end 26. The screw 18 and knob 19 are also shown.

Figure 5:
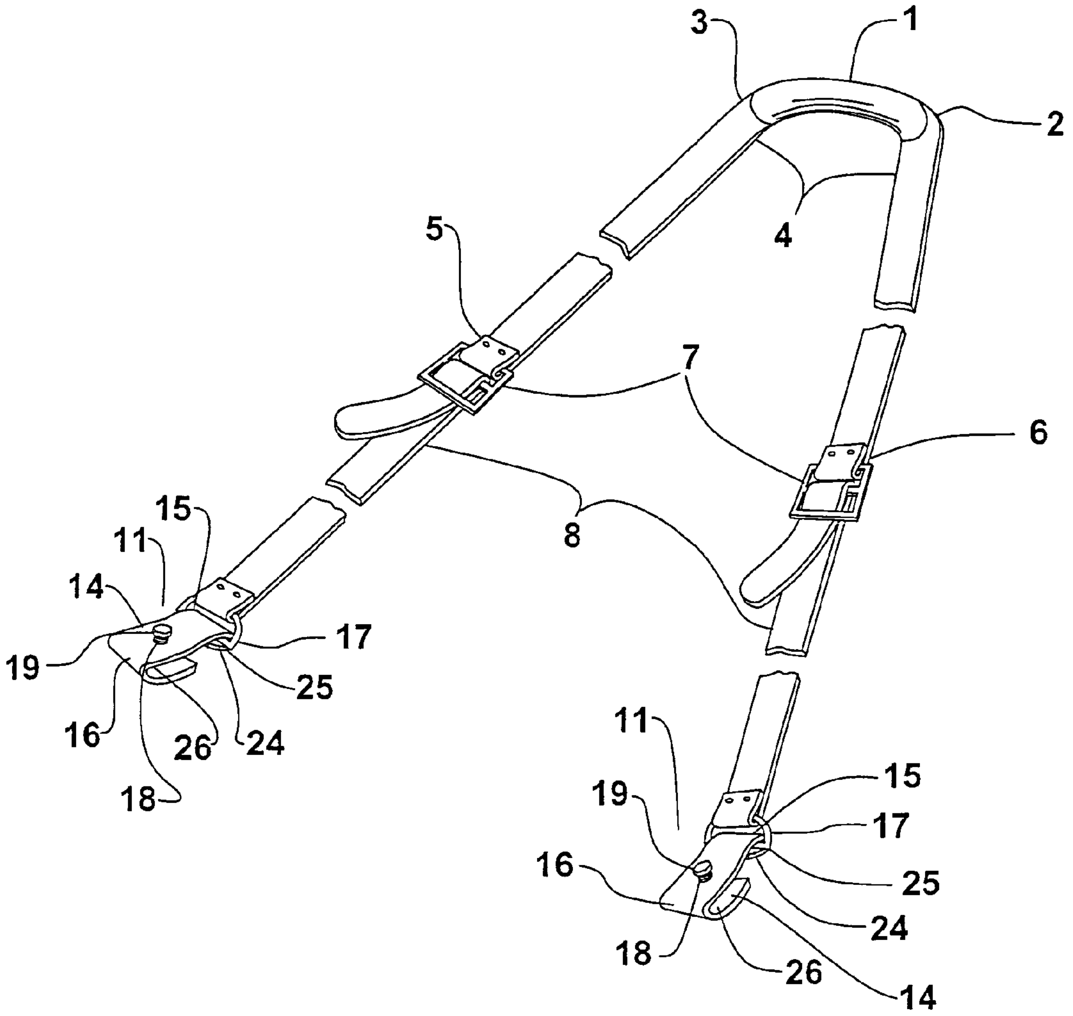
FIG. 5 shows a front view of the shovel attachment of the present invention.

FIG. 5 shows a front view of an embodiment of the shovel attachment of the present invention. It shows the auxiliary handle 1 that has a first flexible member 4 extending from the handle's ends 2 and 3 and wherein the first flexible member's 4 two ends 5 and 6 are each attached to length adjusters 7. It also shows a pair of second flexible members 8 that extend from the pair of length adjusters 7 and that are connected to the ring 17 of the coupling member 11.

As shown in FIG. 5, the length adjuster 7 may be a conventional slide adjuster that houses the first flexible member 4 and second flexible member 8. The slide adjusters are preferably capable of retaining both flexible members for any load that an operator may wish to displace. However, the adjusters may be equipped with a safety feature that is designed to release one or both of the first and second flexible members when the shoveled load reaches a desired amount. This feature, in conjunction with the shovel attachment, will further reduce the risk of muscle, back, joint, or cardiovascular injuries during shoveling. The slide adjusters are preferably plastic but may be any other suitable material such as a metal or alloy. In addition, other equivalent length adjusting means may be used other than slide adjusters, such as a buckle length adjustment device.

FIG. 5 also shows the coupling member 11, which may have a body portion 14 that has a first end 15 and a second end 16, a first retaining hook end 24, the ring 17 retained in the region 25 of the first retaining hook end 24, a second retaining hook end 26, and the screw 18 and knob 19 attached that is inserted through a hole (not shown) in the body portion 14 of the coupling member.

Figure 6:
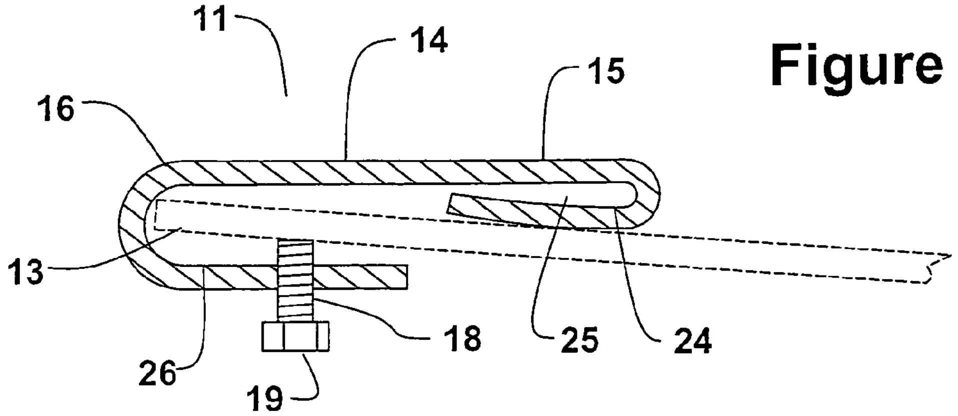
FIG. 6 shows a side view of an embodiment of the coupling member that is attached to the leading edge of a shovel blade.

FIG. 6 represents a side view of an alternate embodiment of the coupling member that is secured to the leading edge of a shovel blade. It shows the coupling member 11 as having a body portion 14, a first end 15, and a second end 16. It also shows the first end 15 as having a retaining hook end 24 that forms a region 25 to retain a ring, the second flexible member or any other means that may aid in retaining the flexible member. The second end 16 is also shown as having a retaining hook end 26. In this embodiment, the screw 18 and knob 19 are located on the second retaining hook end to secure the shovel attachment to the bottom surface of the leading edge 13 of a shovel blade.

Figure 7:
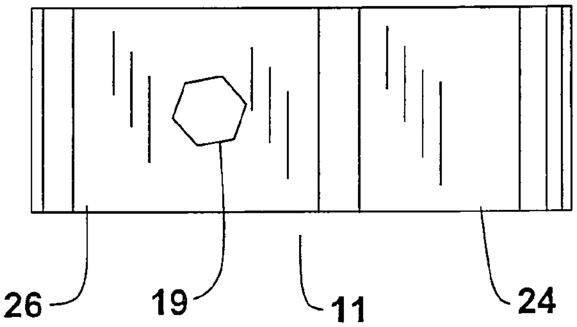
FIG. 7 shoes a bottom view of the coupling member of FIG. 6.

FIG. 7 shows a bottom view of the coupling member 11 of FIG. 6. It shows the second retaining hook end 26, the knob 19 that is situated on the screw (not shown) in the second retaining hook end 26, and the first retaining hook end 24.

Figure 8:
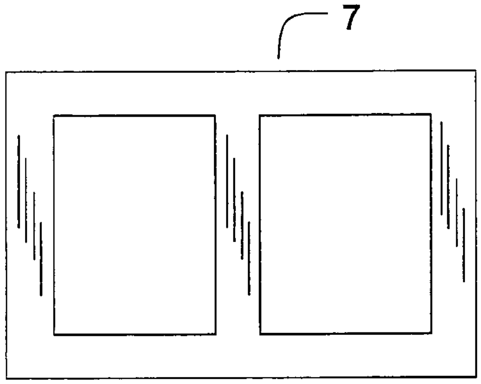
FIG. 8 shows a top view of a length adjuster.

FIG. 8 is provides a top view of one type of length adjuster 7 that may be used. It is a representation of a slide adjuster.

Figure 8A:
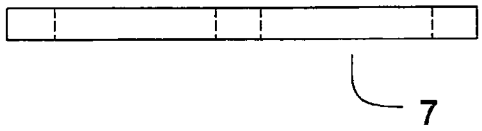
FIG. 8*a* shows a side view of the length adjuster of FIG. 8.

FIG. 8*a* is a side view of the length adjuster of FIG. 8.

FIG. 9 shows a side view of the shovel attachment that is in a vertical position. It shows one side of the first flexible member 4 that extends from one side of the auxiliary handle 1. FIG. 3 also shows an end of the first flexible member 4 that is connected to a length adjuster 7 as well as a second flexible member 8 extending from the slide adjuster 7 to attach to the ring 17 of the coupling member 11. A side view of the coupling member 11 is shown, which shows the body portion 14, the first end 15, the first retaining hook end 24, the ring retained in the region 25 of the first retaining hook end 24, the second end 16, the second retaining hook end 26, and the screw 18 and knob 19 wherein the screw is inserted through a hole (not shown) in the bottom surface of the second retaining hook end.

FIG. 10 shows a bottom view of one embodiment of the shovel attachment. It shows the auxiliary handle 1 that is connected to the coupling members 11 via the flexible members. The flexible members and slide adjusters are obstructed in this view but are of the same general type as provided in FIG. 5. The coupling members' 11 screw 18 and knob 19 are also visible.

FIG. 11 shows a side view of a shovel without the shovel attachment. It shows the shovel having a handle 23, a shaft portion 22, a blade 21, and a leading edge 13. It also depicts two hands 27 and 28 in a position along the shaft 22 and explains the lifting mechanism for single-handle shovels where the hand 27 closest to the shovel blade 21 will be used to lift and the hand 28 furthest from the shovel blade 21 will be used to push.

FIG. 12 shows a side view of the shovel attachment that is attached to the ends of the leading edge 13 of a shovel blade. It shows a shovel with a primary handle 23, a shaft 22, a blade 21, and a blade leading edge 13 that is connected to the shovel attachment of the present invention. It also shows the auxiliary handle, first and second flexible members, and length adjuster as a diagrammatic line that is attached to a coupling member 11 at the bottom end of the line and a hand 27 for lifting at the top end of the line. A second hand 28 that is located on the primary handle 23 is further shown. FIG. 12 explains the lifting mechanism of the present invention where one hand 27 will lift the auxiliary handle in the upwards direction while the other hand 28 also lifts the primary handle 23 in the upwards direction.

The auxiliary handle of the present invention may be a slightly concave handle that has a first and second end and that has an open tunnel along its horizontal axis for inserting the first flexible member. The auxiliary handle may also have an indented upper-half portion. The indented portion has a length that is slightly smaller than the length of the handle. The indented portion also contains gripping aids along its length. The gripping aids are preferably in the form of a plurality of transversely situated slits along the indented portion. The handle is preferably a polyvinyl chloride; however it may be any other thermoplastic material. The handle may also be any other material that is resilient and sturdy but that is generally lightweight, such as a metal or alloy, e.g. aluminum, or carbon fibers or a fiberglass material. In addition, the handle may be any other type of handle that is ordinarily used in conjunction with devices for lifting loads, including a D-shaped handle, a U-shaped handle, or a flat planar handle.

The first flexible member is preferably a woven line but may be any other material that is ordinarily used to support a shoveled load, such as a bungee cord material, a nylon material, a wire or any other material that is flexible yet strong enough for a design strength of about 75 pounds. The first flexible member may be connected to the auxiliary handle by containing a portion of its length inside of the auxiliary handle's tunnel portion such that the portions of the first flexible member extending from the two ends of the handle are substantially the same length. In addition, the portion of the first flexible member that extends through the handle's tunnel may have a filler material inside of it so that the diameter of the first flexible member is of substantially the same diameter as the inside of the tunnel portion. The filler material may include a hard rubber or clay but other commonly used and/or equivalent materials may be used. This enables the flexible member to fit tightly and securely within the handle's tunnel portion. An adhesive may also be used to more securely retain the flexible member within the handle's tunnel. Examples include model cement glue, crazy glue or other ordinarily used adhesive means.

In other embodiments, the handle may not have a tunnel portion and/or the flexible member may be secured to the handle in any other way that is used by those of ordinary skill in the art.

In further embodiments where the handle is of a different design, such as a D-shaped handle, there may be two first flexible members that extend from the bottom of the handle from a closely juxtaposed position to different length adjusting means. Alternatively, there may only be one first flexible member that extends from the D-shaped handle to a length adjusting means, wherein two second flexible members may each extend from the length adjusting means to a different coupling member.

The second flexible members are preferably a woven line. However, they may be any other material that is ordinarily used to support a shoveled load, such as a bungee cord material, a nylon material, a wire or any other material that is flexible yet strong enough for a design strength of about 75 pounds.

The coupling member works by placing the body portion of the gripping member in such a position that its second end hooks onto the leading edge of a shovel blade. The most preferable second hook end angle of about 10 to about 30 degrees helps to maximize the security of the coupling member to the shovel blade. The knob is then turned by a user to force the screw through the body portion's hole and then onto the top surface of the shovel blade until the screw is in contact with the top surface of the shovel blade to a desired degree. In this embodiment, the blade's surface is not modified so the screw secures the shovel attachment to the shovel blade through frictional forces that are present as a result of twisting the knob so that the screw applies a desired amount of pressure to the top surface of the shovel blade.

The first end of the coupling member is curled in such a manner so that a region for retaining a ring that retains the flexible member is formed. The region is preferably defined by the first end being curled to a degree so that its end is pressed close enough to the bottom surface of the gripping member's body portion so that it can securably retain a the ring for attaching to the end of the second flexible member. The ring may be in the form of a double looped ring, similar to a traditional key ring, that can be pried open at either end of the loop to attach to or remove from the gripping member's first end. Similarly, other types of conventional rings may be used to secure an item, such as a single loop or double loop ring that may or may not be hollow and/or that may or may not have any openable slots or sections along its surface. In addition, any other type of equivalent ring or ring-like structure may also be used. The ring is preferably a metal or alloy but it may be a plastic or any other material that is strong enough for a design strength of about 75 pounds. The ring is connected to the end of each second flexible member and it provides pivotal capability to the attaching line since the ring is free to move in its retaining region space and since the second member is flexible.

The end of each second flexible member is preferably connected to the ring by permanent means, such as by looping an end of each flexible member around the ring and then sewing or stitching the looped end of the line to an area on the flexible member that is above the ring. A securing button that penetrates through both layers of the flexible member may also be used. The layers may also be heat bonded or glued together in addition to or rather than buttoned or stitched. Alternatively, other ordinarily used adhesive means may be used.

In other embodiments, the second flexible members may be temporarily connected to the ring, such as by snap locks or Velcro strips placed on the end of the flexible member and complementary locks or Velcro strips placed on a corresponding area of the flexible member. Alternatively, a clamp that contains an adjustable screw or rod may be used rather than the ring to connect the coupling member to each flexible member end. The clamp may be retained in the first end region and it may retain each second flexible member end by twisting or pushing the clamp's adjustable screw or rod through the loop at the end of each flexible member; or the flexible member may contain a hole above its loop for the adjustable screw or rod to penetrate. It should be appreciated by those of ordinary skill art the art that other mechanisms for attaching the clamp to the second flexible member may be employed.

In alternative embodiments, a ring may not be present at the first end of the coupling member so that the coupling member first region may connect to each second flexible member end directly. For example, the hook at the gripping member's first end may be inserted through a loop at the end of each second flexible member.

In other embodiments of the shovel attachment, the shovel blade may have a connecting attachment placed on its top and/or bottom surface and the blade may also have a threaded or non-threaded hole through its surface for receiving the threaded screw to secure the shovel attachment to the shovel blade. The connecting attachments may have a threaded hole for receiving and securing the screw. Alternatively, the shovel blade may not have any modifications on either of it surfaces, and have only a threaded or non-threaded hole through its surface for receiving the threaded screw. A nut or other commonly used fastening means may be used to secure the screw to the shovel blade once the screw has been passed or twisted through the blade's hole. The shovel blade may have a plurality of holes and/or connecting attachments on its surface so that a user may place the shovel attachment in a desired location.

The screw is preferably a metal or alloy but it may be a plastic or other material that is capable of a design strength of about 75 pounds.

Figure 19:
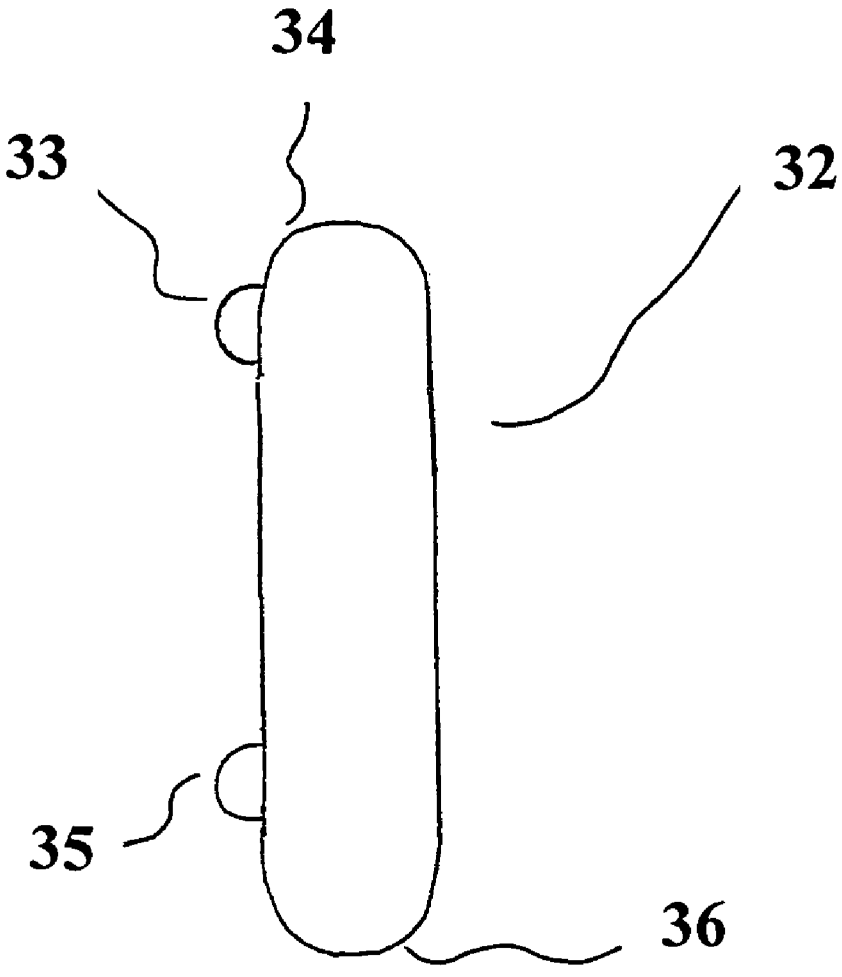
FIG. 19 shows a side view of a pin having a first protrusion towards its top point and having a second protrusion that is retractable towards its bottom point for securing the coupling member to the leading edge of a shovel blade.

In even further embodiments, a pin with at least one manually retractable or permanent protrusion towards its bottom may be used instead of a threaded screw. In this embodiment, the pin may be connected to the coupling member by being placed in the body portion's hole. In addition, the shovel blade may have holes through its surface for receiving the pin wherein a user will manually push in the protrusion(s) so that the pin can be forced through the hole in the shovel blade. The protrusion(s) may then be allowed to expand once the pin has been forced through the blade's hole in order to secure the shovel attachment to the blade. The pin may also have a manually retractable or permanent protrusion towards its top point for ensuring that the pin does not slide through the body portion's hole of the shovel blade's hole. FIG. 19 shows an example of an embodiment of such a pin. The pin 32 has one protrusion 33 located towards its top point 34 and one retractable protrusion 35 located towards it bottom point 36 for securing the coupling member to the leading edge of the shovel blade. The pin is preferably a metal or alloy but it may be a plastic or other material that is commonly used for connecting two items as long as the plastic and material are strong enough for a design strength of about 75 pounds.

Alternatively, the shovel blade may have connecting attachments on its top and/or bottom surface that are molded as such to receive and secure the pin with at least one protrusion to the shovel blade. The connecting attachments may be placed on the same vertical plane if they are placed on the top and bottom surfaces so that a user may connect the pin to the top and bottom connecting attachments. The shovel blade may have a plurality of connecting attachments placed throughout its top and/or bottom surfaces so that a user may place the shovel attachment as desired. The pin is preferably a metal or alloy but it may be a plastic or other material that is commonly used for connecting two items as long as the plastic or other material is strong enough for a design strength of about 75 pounds.

Pursuant to another form of the present invention, the holes that may be placed on the shovel blade may contain grooves in addition to or rather than being threaded. In the case of a solely grooved hole, the grooves may be designed to securely hold a screw or rod. For example, the grooves may direct a complementary screw or rod through its hole to a position where a user may twist the screw or rod in order to secure it to the grooved hole. In the case of a hole that is threaded and grooved, the threads may provide additional securing means so that a complementary rod or screw may be guided through the grooves to a location where threads are present so that a user may twist the rod or screw for additional securing means.

In further embodiments, the coupling member may be a ring clamp, wherein the clamp is attached to the shovel blade and the ring is connected to each flexible member end.

In even further embodiments, the coupling member may be a flexible plastic or other flexible material that can bend over the edge or sides of the shovel blade to form a U-shaped coupling member. The coupling member may connect to the shovel blade using snap locks wherein the coupling member may have snap locks located on its ends so that its ends may be bent to form the U-shaped member and thereby attach to complementary snap locks that are located on the top and bottom surfaces of the shovel. The snap locks on the top and bottom surface of the blade are preferably placed along the same vertical plane. The shovel blade may also, in this embodiment, have a plurality of snap locks on its top and bottom surfaces so that a user may place the shovel attachment in a desired location. Further the second flexible members may be affixed to the coupling members directly without the use of a ring or, alternatively, the lines may be connected to a ring which is then connected to the flexible coupling member. Velcro strips may replace the snap locks in other embodiments or Velcro strips may be used in conjunction with snap locks.

Alternatively, the flexible coupling member may have complementary snap locks and the shovel blade may have holes along its surface so that each flexible coupling member can snap lock through the shovel blade's hole.

In another form of the invention, the first and second end of the coupling member may be a variety of other embodiments instead of a curled hook-like region. The other embodiments may include clips, snap clips, springs, or other mechanical attachment devices that are commonly used in the art.

In further embodiments, the coupling member may be in the form of connector buckles located at each second flexible member's end that may be connected to a complementary buckle that is attached to the shovel blade. The complementary buckle may be attached to the shovel blade through a strap that is connected to the buckle and to the shovel blade. The strap may be attached to the shovel blade by looping through holes that may be present on the blade. Other means, however, may be used for securing the strap to the shovel blade, such as with a screw or pin that is inserted through the strap and shovel blade or any other equivalent connecting means. In addition, Velcro or snap locks may be used to secure the connector buckle to the second flexible member and/or the complementary buckle to the shovel blade. Any other adhesive mechanism that is commonly used in the art may also be employed, such as a snap clip device. The connector buckles that may be used include male and female connector buckles and their equivalents that are commonly used on backpacks and the like. The buckles may also provide a length adjusting feature to the shovel blade and the shovel attachment.

Figure 13:
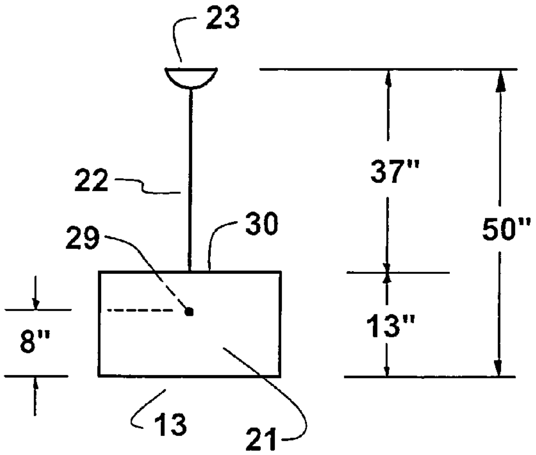
FIG. 13 shows a front view of a shovel in a vertical plane and illustrates the typical distances between different points on the shovel.
Figure 14:
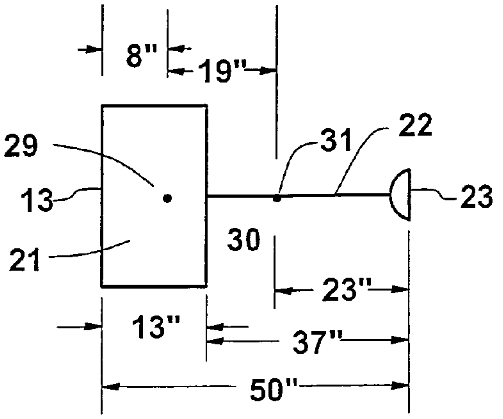
FIG. 14 shows a front view of the shovel of FIG. 13 in a horizontal plane and illustrates the typical distances between different points on the shovel.
Figure 15:
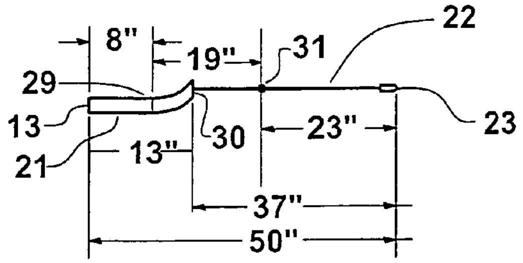
FIG. 15 shows a side view of the shovel of FIG. 13 and illustrates the typical distances between different points on the shovel.

FIGS. 13 to 15 are described below and show estimated distances between different points on a conventional shovel. The distance values shown in FIGS. 13 to 15 will be used in calculating and comparing the force that is necessary to lift a shoveled load with and without the shovel attachment of the present invention.

FIG. 13 shows a front view of a conventional shovel in a vertical plane as well as provides estimated distances between different points on a shovel. In particular, it shows the total distance of a shovel—from the leading edge 13 of the shovel blade to the top of the shovel's handle 23—to be 50 inches. The distance from the blade's leading edge 13 to the center of gravity 29 on the blade 21 is also estimated as typically encompassing 8 inches. Next, the estimated distance from the leading edge 13 of the blade 21 to the top 30 of the blade 21 is estimated to be 13 inches and the distance from the top 30 of the blade 21 to the top of the handle 23 is estimated as typically spanning 37 inches.

FIG. 14 shows a view of the shovel of FIG. 13 except in a horizontal plane and it provides two estimated distances in addition to the distances provided in FIG. 13. The first additional estimate is 19 inches which covers the distance between the shovel blade's 21 center of gravity 29 and the point 31 on the shaft 22 where a user will typically apply a lifting force in a shovel that is not equipped with the shovel attachment of the present invention. The second additional distance is 23 inches from the top of the shovel handle 23 to the point 31 on the shaft 22 where a user will typically apply a lifting force in a shovel that does not contain the present invention's shovel attachment.

FIG. 15 shows a side view of the shovel of FIG. 14 as well as illustrates the same distances that were provided in FIG. 14.

Figure 16:
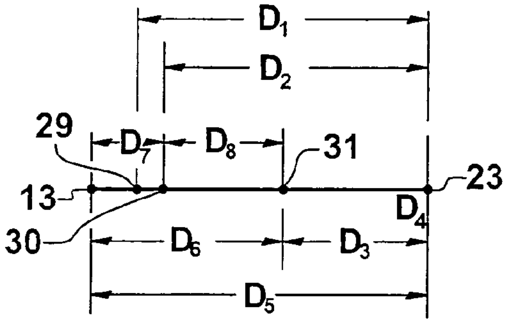
FIG. 16 represents a distance diagram of the shovel of FIGS. 13 to 15.

FIG. 16 represents a distance diagram of the shovel of FIGS. 13 to 15. It provides distance identifiers for the different distances that were presented in FIGS. 13 to 15. $D_1$ represents the distance between the center of gravity 29 of the shovel blade and the top of the handle 23, which corresponds to a distance of 42 inches. $D_2$ is the distance between the top 30 of the shovel blade and the top of the handle 23, which encompasses a distance of 37 inches. $D_3$ represents the distance between the top of the handle 23 and the point 31 on the shaft where a user will typically apply a lifting force in a shovel that is not equipped with the shovel attachment of the present invention. $D_3$ corresponds to a distance of 23 inches. $D_4$ represents a distance of 0 inches because it corresponds only to the point on the top of the handle 23. $D_5$ symbolizes the total distance of the shovel, which is between the leading edge 13 of the shovel blade and the top of the handle 23. $D_5$ represents a distance of 50 inches. $D_6$ denotes the distance between the leading edge 13 of the shovel blade and the point 31 on the shaft where a user will typically apply a lifting force in a shovel that is not equipped with the shovel attachment of the present invention. $D_6$ encompasses a length of 27 inches. $D_7$ characterizes the distance between the leading edge 13 and top 30 of the shovel blade, which represents a distance of 13 inches. $D_8$ signifies the distance between the top 30 of the shovel blade and the point 31 on the shaft where a user will typically apply a lifting force in a shovel that is not equipped with the shovel attachment of the present invention. $D_8$ corresponds to a distance of 14 inches.

Figure 17:
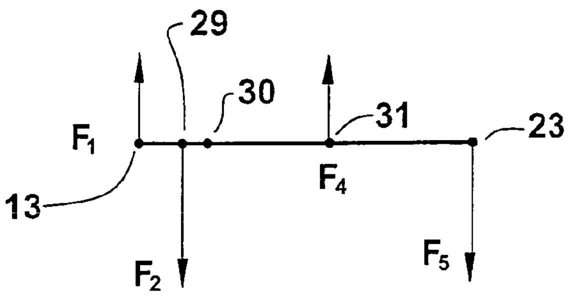
FIG. 17 represents a force diagram of the shovel of FIGS. 13 to 15 without using the shovel attachment of the present invention.

FIG. 17 is an illustration of the forces that are applied to the shovel of FIGS. 13 to 15 without the shovel attachment of the present invention in order to displace a shoveled load. FIG. 17 shows an upward force ($F_4$) that is applied by one hand of an operator at a point 31 along the shaft of the shovel and a downward force ($F_5$) that is applied by the other hand of an operator at the shovel's handle 23. FIG. 17 also shows the downward force ($F_2$) that is exerted from the load on the shovel.

Figure 18:
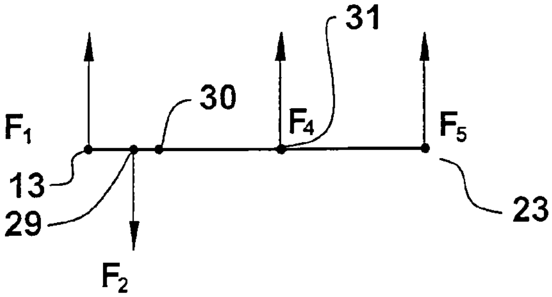
FIG. 18 represents a force diagram of the shovel of FIGS. 13 to 15 while using the shovel attachment of the present invention.

FIG. 18 shows the forces that are applied to the shovel of FIGS. 13 to 15 while using the shovel attachment of the present invention in order to displace a shoveled load. Unlike FIG. 17, FIG. 18 shows an upward force ($F_5$) that is applied by one hand of an operator at the shovel's handle 23. It also shows a second upward force ($F_1$) that is applied by the other hand of an operator at a point where the auxiliary handle will extend from the leading edge 13 of the shovel blade. FIG. 18 also shows the downward force ($F_2$) that is applied by the load on the shovel blade.

EXAMPLES

The following examples are prophetic representations of the different forces that are required to displace a load with the shovel attachment and without the shovel attachment. The following examples are based on the representations of FIGS. 13 to 18.

Example 1

Prophetic

The force required to displace a load for a shovel without the shovel attachment of the present invention is determined using the dimensions provided in FIGS. 13 to 16 and the force diagram illustrated in FIG. 17. To calculate the force, it is first assumed that:

There is no rotation;

$$F_2=\text{Shovel load}=10^{\#};$$

$$\Sigma F_V=\emptyset=F_4-F_2-F_5;$$

$$\Sigma F_H=\emptyset;$$

$$\Sigma F_1=\emptyset;\text{ and}$$

$$\Sigma\Gamma=\Sigma M=\emptyset=(F_2D_1)+(F_5D_4)-(F_4D_3).$$

Next, the values that have been assumed above as well as the distances values of FIGS. 13 to 15 are substituted in the equations. Therefore:

$$\Sigma\Gamma=\Sigma M=\emptyset=(F_2D_1)-(F_4D_3)=(10\times 42)-(F\times 23).$$

$F_4$ is then isolated to obtain its value:

$$F_4=420/23=18.3^{\#}.$$

$F_5$ is then determined by solving the equation for $\Sigma F_V$ to equal $F_5$. Therefore:

$$F_5=F_4-F_2=18.3^{\#}-10^{\#}=8.3^{\#}.$$

From the foregoing calculations and in reference to the force diagram of FIG. 17, it is seen that for a right handed person using a shovel without the shovel attachment of the present invention, the force exerted by a person's left hand ($F_4$) will be $18.3^{190}$ ↑ and the force exerted by a person's right hand ($F_5$) will be $8.3^{\#}$↓. Therefore, the total force exerted by the body will be $26.6^{\#}$, which is the sum of the forces applied by a person's right hand ($F_5$) and left hand ($F_4$).

Example 2

Prophetic

The force required to displace a load for a shovel while using the shovel attachment of the present invention is determined using the dimensions provided in FIGS. 13 to 16 and the force diagram illustrated in FIG. 18. To calculate the force, it is first assumed that:

There is no rotation;

$$F_2=\text{Shovel load}=10^{\#};$$

$$\Sigma F_V=\emptyset=F_1+F_5-F_2;$$

$$\Sigma F_4=\emptyset;\text{ and}$$

$$\Sigma\Gamma=\Sigma M=\emptyset=(F_1D_5)-(F_2D_1)-(F_4D_3)-[F_5(D_3+D_4)].$$

Next, the values that have been assumed above and the distance values in FIGS. 13 to 15 are substituted in the equations. Therefore:

$$\Sigma\Gamma=\Sigma M=\emptyset=(F_1D_5)-(F_2D_1)=(F1\times 50)-(10\times 42).$$

$F_1$ is then isolated to obtain its value:

$$F_1=420/50=8.4^{\#}.$$

$F_5$ is then determined by solving the equation for $\Sigma F_V$ to equal $F_5$. Therefore:

$$F_5=F_2-F_1=10^{\#}-8.4^{\#}=1.6^{\#}.$$

From the foregoing calculations and in reference to the force diagram of FIG. 18, it is seen that for a right handed person using a shovel with the shovel attachment of the present invention, the force exerted by a person's left hand ($F_1$) will be $8.4^{\#}$↑ and the force exerted by a person's right hand ($F_5$) will be $1.6^{\#}$↑. Therefore, the total force exerted by the body will be $10^{\#}$, which is the sum of the forces applied by a person's right hand ($F_5$) and left hand ($F_1$). It is also important to note that in this example a person applies the same upwards lifting force ($F_1$↑ and $F_5$↑) whereas in the earlier example without the shovel attachment, a person applies an opposing upwards ($F_4$↑) and downwards ($F_5$↓) force.

From the foregoing, it is shown that the shovel attachment of the present invention will decrease the force that is required to displace a shoveled load. Table 1, below, provides a summary of the results that have been illustrated in prophetic examples 1 and 2.

TABLE 1

Summary of Results from Prophetic Examples 1 and 2

| | Force Exerted by Left Hand | Force Exerted by Right Hand | Total Force Exerted |
|---|---|---|---|
| Without Shovel Attachment | $18.3^{\#}$↑ | $8.3^{\#}$↓ | $26.6^{\#}$ |
| With Shovel Attachment | $8.4^{\#}$↑ | $1.6^{\#}$↑ | $10.0^{\#}$ |

What is claimed is:

1. An attachment for a shovel comprising:

an auxiliary handle;

at least one first flexible member extending from said auxiliary handle to a means for adjusting the first flexible member's length;

at least one second flexible member extending from said length adjusting means to a shovel coupling member wherein said shovel coupling member attaches to a leading edge of a shovel blade, said shovel coupling member comprising a body portion, a first end, and a second end, said first end of said coupling member having a region for retaining said second flexible member, said second end of said coupling member having a region for retaining said leading edge of said shovel blade, said body portion of said coupling member having a means for securing said coupling member to said leading edge of said shovel blade.

2. The attachment according to claim 1 wherein said region of said first end of said coupling member is a curled hook-end.

3. The attachment according to claim 2 wherein a ring is retained in said curled-hook-end region, said second flexible member attached to said ring.

4. The attachment according to claim 3 wherein said region of said second end of said coupling member is a curled hook-end that is curled to an angle of less than about 90 degrees.

5. The attachment according to claim 4 wherein said angle is less than about 60 degrees.

6. The attachment according to claim 4 wherein said angle is less than about 45 degrees.

7. The attachment according to claim 4 wherein said angle is from about 10 to about 30 degrees.

8. The attachment according to claim 4 wherein said means for securing said coupling member to said leading edge of said shovel blade comprises a threaded screw that twists through a hole on said body portion of said coupling member to contact the top surface of said leading edge of said shovel blade, said hole on said body portion is a threaded hole and said threaded screw having a knob surrounding the top surface of said threaded screw to help twist said threaded screw.

9. The attachment according to claim 8 wherein said length adjusting means is a slide adjuster.

10. The attachment according to claim 9 wherein said first flexible member is a woven line.

11. The attachment according to claim 10 wherein said second flexible member is a woven line.

12. The attachment according to claim 4 wherein said means for securing said coupling member to said leading edge of said shovel blade comprises a pin having a top point, a bottom point, and a mid-point, said pin having at least one manually retractable protrusion between said bottom point and said top point, wherein said pin is pushed through a hole on said body portion of said coupling member and a hole on the surface of said leading edge of said shovel blade, said hole in said body portion is non-threaded and said hole on said leading edge of said shovel blade is non-threaded, said pin also having a means for preventing said pin from exiting said body portion hole.

13. The attachment according to claim 12 wherein said preventing means is a knob surrounding the top surface of said pin.

14. The attachment according to claim 12 wherein said preventing means is at least one protrusion located between said mid point of said pin and said top point of said pin.

15. An attachment for a shovel comprising:

an auxiliary handle, said auxiliary handle having a first end, a second end, and a tunnel portion through said handle's length;

a first flexible member extending through said tunnel portion of said auxiliary handle, said first flexible member having a first protruding extension extending from said first end of said auxiliary handle and a second protruding extension extending from said second end of said auxiliary handle;

a first slide adjuster connected to the end of said first flexible member first protruding extension and a second slide adjuster connected to the end of said first flexible member second protruding extension;

a pair of second flexible members, one of said pair of said second flexible members connected to said first slide adjuster and extending to a lower end and the second of said pair of said second flexible members connected to said second slide adjuster and extending to a lower end; and a first coupling member connected to said lower end of said one of said pair of said second flexible members and a second coupling member connected to said lower end of said second of said pair of said second flexible members, said first and said second coupling members comprising a body portion, a first end, and a second end, wherein said first end of said coupling members have a region for retaining a ring, said first end region comprising a curled hook-end, said ring of said first coupling member attaching to said lower end of said one of said pair of said second flexible members, said ring of said second coupling member attaching to said lower end of said second of said pair of said flexible members, said second end of said coupling members having a region for retaining opposite ends of a leading edge of a shovel blade, said second end region comprising a curled hook-end that is curled to an angle of from about 10 degrees to about 30 degrees, said body portion of said coupling members comprises a means for securing said coupling member to said leading edge of said shovel blade, said means for securing said coupling members to said leading edge of said shovel blade comprises a threaded screw that twists through a hole on said body portion of said coupling member to contact the top surface of said leading edge of said shovel blade to secure said coupling members to the top surface of said leading edge, said hole on said body portion is a threaded hole and said threaded screw having a knob surrounding the top surface of said threaded screw to help twist said threaded screw, said knob is knurled around said knob's perimeter.

16. A two-handle shovel comprising:

a shovel blade;

a primary shaft connected to said shovel blade;

a primary handle connected to said primary shaft;

an auxiliary handle;

at least one first flexible member extending from said auxiliary handle to a means for adjusting said first flexible member's length;

at least one second flexible member extending from said length adjusting means to a lower end; and a coupling member having a body portion, a first end, and a second end, wherein said first end is connected to said second flexible member, wherein said second end is connected to a point on a leading edge of said shovel blade, and wherein said body portion has a means for securing said coupling member to said leading edge of said shovel blade.

* * * * *